US012553265B2

(12) United States Patent
Hage et al.

(10) Patent No.: US 12,553,265 B2
(45) Date of Patent: Feb. 17, 2026

(54) LOCK FOR MOVABLE FREIGHT CONTAINER CARGO DOOR

(71) Applicants: Joseph Hage, Huntington Beach, CA (US); Pierre Touma, Austin, TX (US); Elias Bachaalany, Halat (LB); Imad Maalouf, El Metn (LB)

(72) Inventors: Joseph Hage, Huntington Beach, CA (US); Pierre Touma, Austin, TX (US); Elias Bachaalany, Halat (LB); Imad Maalouf, El Metn (LB)

( * ) Notice: Subject to any disclaimer, the term of this patent is extended or adjusted under 35 U.S.C. 154(b) by 373 days.

(21) Appl. No.: 18/093,801

(22) Filed: Jan. 5, 2023

(65) Prior Publication Data

US 2023/0151646 A1 May 18, 2023

Related U.S. Application Data

(63) Continuation-in-part of application No. 29/829,526, filed on Mar. 5, 2022, now abandoned, and a (Continued)

(51) Int. Cl.

*E05B 83/10* (2014.01)
*E05B 67/06* (2006.01)
*E05B 83/08* (2014.01)

(52) U.S. Cl.

CPC ............ *E05B 83/10* (2013.01); *E05B 67/063* (2013.01); *E05B 83/08* (2013.01)

(58) Field of Classification Search

CPC ........ E05B 67/063; E05B 67/22; E05B 83/02; E05B 83/08; E05B 83/10

See application file for complete search history.

(56) References Cited

U.S. PATENT DOCUMENTS 1,792,403 A 2/1931 Stone
2,592,647 A 4/1952 Black
(Continued)

FOREIGN PATENT DOCUMENTS

EP 2186973 11/2008
GB 2342381 12/2000
(Continued)

*Primary Examiner* — Christopher J Boswell

(57) ABSTRACT

A lock for permanent attachment to a movable freight container cargo door as a replacement for a prior art hasp or a prior art keeper. The lock is configured for permanent attachment to the cargo door using pre-existing hole locations for the prior art hasp or keeper. The lock comprises a straight shackle and a c-shaped lock body and is configured to retain a door handle between the shackle and the back of the c-shaped lock body. The shackle is locked into the lock body using a shackle lock element that engages with a groove in the shackle. The shackle groove is perpendicular to the shaft of the shackle. The shackle lock element is pressed into the groove using by one or more springs in linear direction that is perpendicular to the length of the shackle and perpendicular to the groove, and released from the groove through by a lock module, which could be a lock cylinder or an electronic lock module. Axial movement of the shackle to prevent the shackle from being completely removed from the lock body is accomplished by a screw in the lock body that rides into a longitudinal slot in the shaft of the shackle.

20 Claims, 12 Drawing Sheets

Related U.S. Application Data continuation-in-part of application No. 16/876,095, filed on May 17, 2020, now Pat. No. 11,551,498, which is a continuation-in-part of application No. 16/271,825, filed on Feb. 9, 2019, now Pat. No. 10,713,613, which is a continuation-in-part of application No. 15/942,559, filed on Apr. 1, 2018, now Pat. No. 10,267,061.

(60) Provisional application No. 63/307,591, filed on Feb. 7, 2022, provisional application No. 62/480,983, filed on Apr. 3, 2017.

(56) References Cited

U.S. PATENT DOCUMENTS

| | | | | |
|---|---|---|---|---|
| 3,581,530 | A | 6/1971 | Raspadori | |
| 4,082,330 | A | 4/1978 | McWhorter | |
| 4,134,281 | A | 1/1979 | Pelcin | |
| 4,183,235 | A | 1/1980 | Coralli et al. | |
| 4,229,955 | A * | 10/1980 | Coralli | E05B 67/36 70/52 |
| 5,035,127 | A | 7/1991 | Larsen | |
| 5,442,941 | A | 8/1995 | Kahonen et al. | |
| 5,735,146 | A | 4/1998 | Taplin | |
| 6,553,798 | B1 | 4/2003 | Larsen et al. | |
| 6,675,614 | B2 | 1/2004 | Lai | |
| 7,073,357 | B2 * | 7/2006 | Nixon, Jr. | E05B 83/10 70/201 |
| 7,210,316 | B1 | 5/2007 | Falconer et al. | |
| 7,278,284 | B1 | 10/2007 | James | |
| 8,627,693 | B1 | 1/2014 | Haber | |
| 8,640,507 | B1 | 2/2014 | Derman | |
| 9,500,003 | B1 * | 11/2016 | Haber | E05B 83/10 |
| 9,562,374 | B1 * | 2/2017 | Haber | E05B 67/38 |
| 9,822,558 | B1 | 11/2017 | Blankenship | |
| 10,089,811 | B2 | 10/2018 | Ufkes | |
| 10,267,061 | B2 * | 4/2019 | Hage | E05B 45/08 |
| 10,713,613 | B2 * | 7/2020 | Hage | E05B 45/08 |
| 10,954,699 | B2 * | 3/2021 | Pare | E05B 83/10 |
| 11,551,498 | B2 * | 1/2023 | Hage | E05B 67/063 |
| 2004/0221626 | A1 | 11/2004 | Palzkill et al. | |
| 2005/0144991 | A1 | 7/2005 | Bravo et al. | |
| 2006/0065023 | A1 | 3/2006 | Loughlin et al. | |
| 2006/0201210 | A1 | 9/2006 | Gogel | |
| 2008/0216524 | A1 * | 9/2008 | Abdelazeem | E05B 83/10 70/91 |
| 2011/0018707 | A1 | 1/2011 | Dobson et al. | |
| 2011/0316291 | A1 | 12/2011 | Loughlin et al. | |
| 2012/0293655 | A1 | 11/2012 | Loughlin et al. | |
| 2015/0292243 | A1 | 10/2015 | Kongshammer | |
| 2018/0313110 | A1 | 11/2018 | Pare | |
| 2020/0279446 | A1 * | 9/2020 | Hage | E05B 67/063 |
| 2022/0180681 | A1 | 6/2022 | Ufkes et al. | |

FOREIGN PATENT DOCUMENTS

| | | |
|---|---|---|
| WO | 2007122609 | 11/2007 |
| WO | 2018034617 | 2/2018 |

* cited by examiner

LOCK FOR MOVABLE FREIGHT CONTAINER CARGO DOOR

CROSS REFERENCE TO RELATED APPLICATIONS

This application claims benefit of U.S. Provisional Patent Application No. 63/307,591 filed 7 Feb. 2022 This application is also a continuation-in-part of U.S. patent application Ser. No. 16/876,095 filed 17 May 2020, which is a continuation-in-part of U.S. patent application Ser. No. 16/271,825 filed 9 Feb. 2019, now U.S. Pat. No. 10,713,613, which is a continuation-in-part of U.S. patent application Ser. No. 15/942,559 filed 1 Apr. 2018, now U.S. Pat. No. 10,267,061, which claims benefit of U.S. Provisional Patent Application Ser. No. 62/480,983, filed 3 Apr. 2017. U.S. patent application Ser. No. 16/876,095 also claims benefit of U.S. Provisional Patent Application Ser. No. 62/850,546, filed 21 May 2019. This application is also a continuation-in-part of U.S. Design Pat. application Ser. No. 29/829,526 filed 5 Mar. 2022. The contents of all aforementioned documents are incorporated by reference herein.

FIELD OF INVENTION

Embodiments of the invention relate to systems and methods for locking motor vehicle freight containers and/or movable freight containers. More specifically, embodiments of the present invention relate to the locking of the cargo doors of such vehicle trailers and/or containers.

BACKGROUND

The US Federal Bureau Investigation reported that in 2015 over $30B of cargo was lost in the USA due to theft. Theft rates can be even higher abroad. To address this, a locking system, with an optimal combination of theft prevention features is desired. The following is a list of desirable features for a secure lock for a movable freight container:

(a) The system and/or method should be compatible with existing systems for securing movable freight containers and furthermore, should be a drop-in replacement for existing hardware for securing such freight containers.

(b) The system and/or method should work consistently in a typical freight container environment, including exposure to a broad temperature range, moisture, humidity, shock, vibration, dirt, chemicals, and pollution.

(c) The system and/or method should use thick and hardened components in places where a thief might try to cut or saw any part of the locking system.

(d) The system and/or method should minimize or eliminate any spots a lock in the system could be pried open.

(e) The system and/or method should be as inexpensive and easy to manufacture as possible.

(f) The system and/or method should be easy to install.

BRIEF DESCRIPTION OF THE DRAWINGS

For a more complete understanding of the present invention and the advantages thereof, reference is made to the following description taken in conjunction with the accompanying drawings in which like reference numerals indicate like features and wherein.

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment.

It should be understood that various changes could be made in the function and arrangement of elements without departing from the spirit and scope as set forth in the appended claims. Preferred embodiments of the present invention are illustrated in the Figures, with like numerals being used to refer to like and corresponding parts of the various drawings. Specific details are given in the following description to provide a thorough understanding of the embodiments. However, it will be understood by one of ordinary skill in the art that the embodiments may be practiced without these specific details.

1. Definitions.

For purposes of describing embodiments of the invention and claims, a movable freight container (hereinafter a "container") is defined as any storage unit configured to be filled with cargo, closed, and transported. Examples of movable freight containers include, but are not limited to, a sealable delivery truck cargo compartment, a motor vehicle freight trailer, an intermodal freight container, a railway wagon, and a unit load device for air freight. Movable freight containers are typically sealed, and often locked. The term "cargo trailer" is a synonym for any movable freight container that can be pulled behind a motor vehicle.

2. Overview of One Embodiment of the System and Method.

The present invention comprises a system and method for securely locking the cargo door of a movable freight container (hereinafter also simply referred to as a "container"), such as a motor vehicle freight trailer, an intermodal freight container, a railway wagon, a unit load device for air freight, or any similar storage unit designed to be filled, sealed, and transported.

Figure 1:
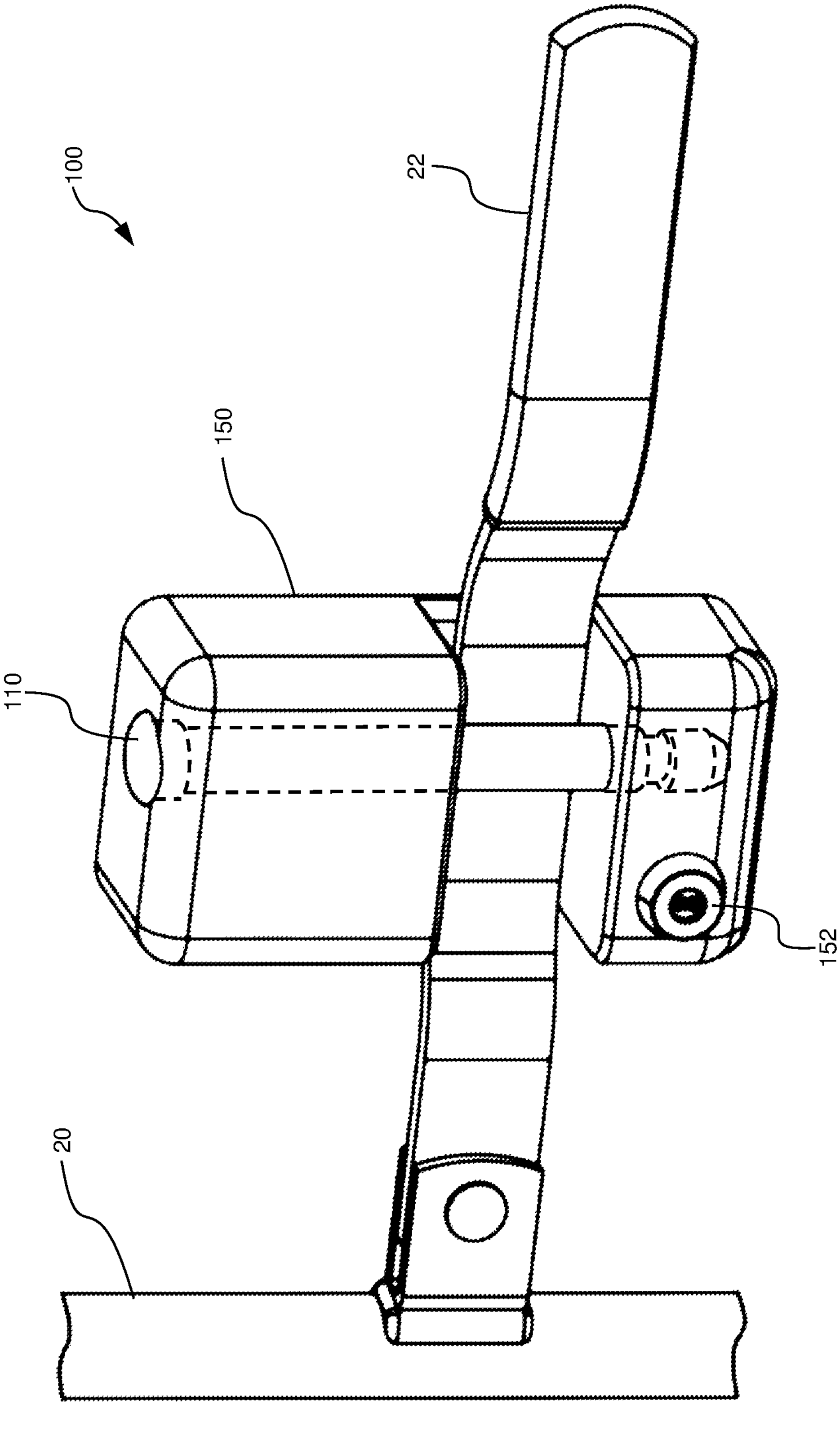
FIG. 1 shows one embodiment a lock for a movable freight container.
Figure 2C:
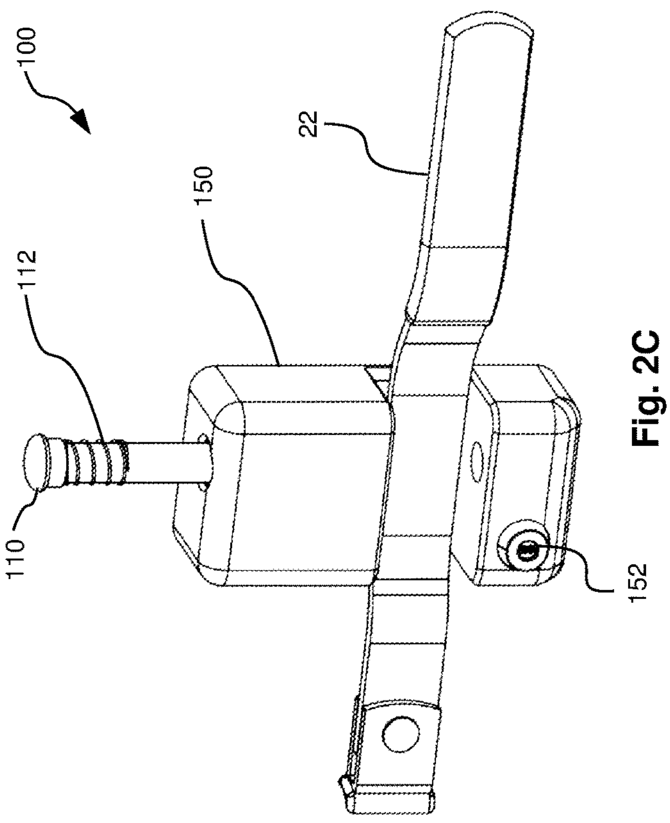
FIG. 2C shows the embodiment of FIG. 1 with the shackle in an open position.
Figure 2B:
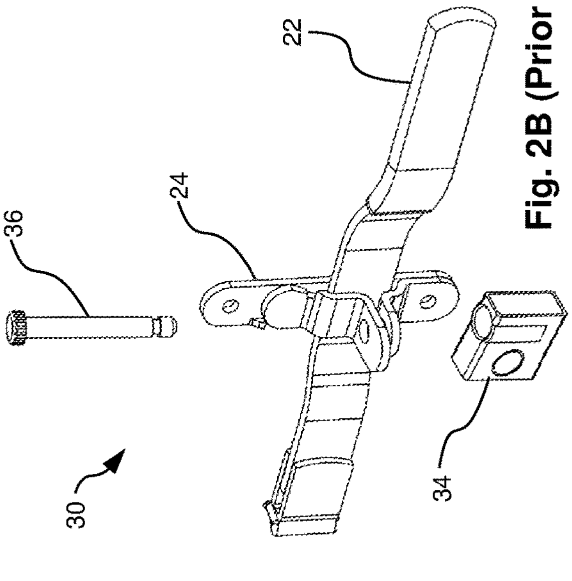
Fig. 2B (Prior Art)
FIG. 2B shows a prior art lock system for a movable freight container.
Figure 2A:
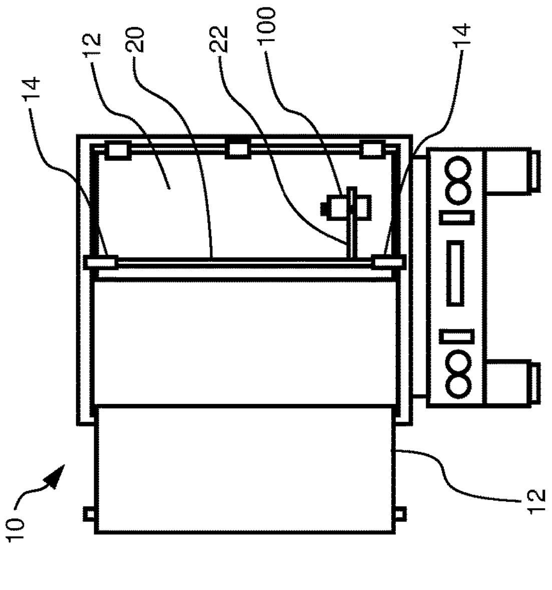
FIG. 2A shows the cargo doors of a movable freight container.

FIG. 1, FIG. 2A, and FIG. 2C illustrate one embodiment of the present invention at 100. As shown in FIG. 2A, this lock embodiment 100, is a system and method for a movable freight container 10, and more specifically for attachment to a cargo door 12 of a movable freight container 10. The embodiment, shown at 100 in FIG. 1, FIG. 2A and FIG. 2C, can comprise one or more of the following elements and functionality:

(a) A c-shaped lock body assembly, shown at 150, that is configured for permanently bolting to the cargo door 12;

(b) A straight shackle, shown at 110, that fits across a recess of the c-shaped lock body assembly 150 to retain a cargo door handle 22, the shackle 110 being held by two portions of the lock body assembly on opposite sides of the recess;

(c) A lock cylinder 152 configured to selectively allow the shackle 110 to move out of the recess and release the handle 22 or securely retain the handle 22 between the shackle 110 and a base portion of the lock body assembly 150.

Also shown in FIG. 2A are a cam action lock rod 20 retained behind two cam action lock rod braces (also called cam action rod keepers), shown at 14, that secure the top and bottom of the cam action lock rod (or pipe) 20, and thereby the movable freight container cargo door 12. FIG. 1 more clearly illustrates that the cam action lock rod handle 22 is permanently attached and rotationally coupled to the cam action lock rod 20 that secures the movable freight container door (12 in FIG. 2A). As will be described in greater detail later in this disclosure, FIG. 2C shows a shackle release spring 112 that sits on an outside circumference of a head end of the cylindrical shackle 110. In the embodiment shown at 100, the shackle release spring 112 is not visible or externally accessible when the shackle 110 is fully inserted into the lock body assembly 150.

The embodiments shown in FIG. 1, FIG. 2A, and FIG. 2C are configured to replace the prior art cam action lock rod cargo door lock system and method shown at 30 in FIG. 2B. This prior art system 30 comprises the same door handle 22 as the lock embodiment 100 shown in FIG. 1, FIG. 2A and FIG. 2C. The prior art system 30 comprises a prior art hasp 24, that uses a prior art lock pin 36, and a prior art mechanical lock module 34, or seal. It can be understood that the door handle shown at 22 in FIG. 2B is attached to the cam action lock rod, shown at 20 in FIG. 1 and FIG. 2A. The prior art hasp 24 would typically be attached to the movable freight container door (12 in FIG. 2A) using bolts that go through holes in the movable freight container door. Embodiments of the invention shown and described herein can be configured to use these same through holes in the moveable freight container door to attach the lock (100 in FIG. 1, FIG. 2A, and FIG. 2C), and more specifically the c-shaped lock body assembly 150 to the freight container door.

3. Description of One Embodiment.

Figure 4:
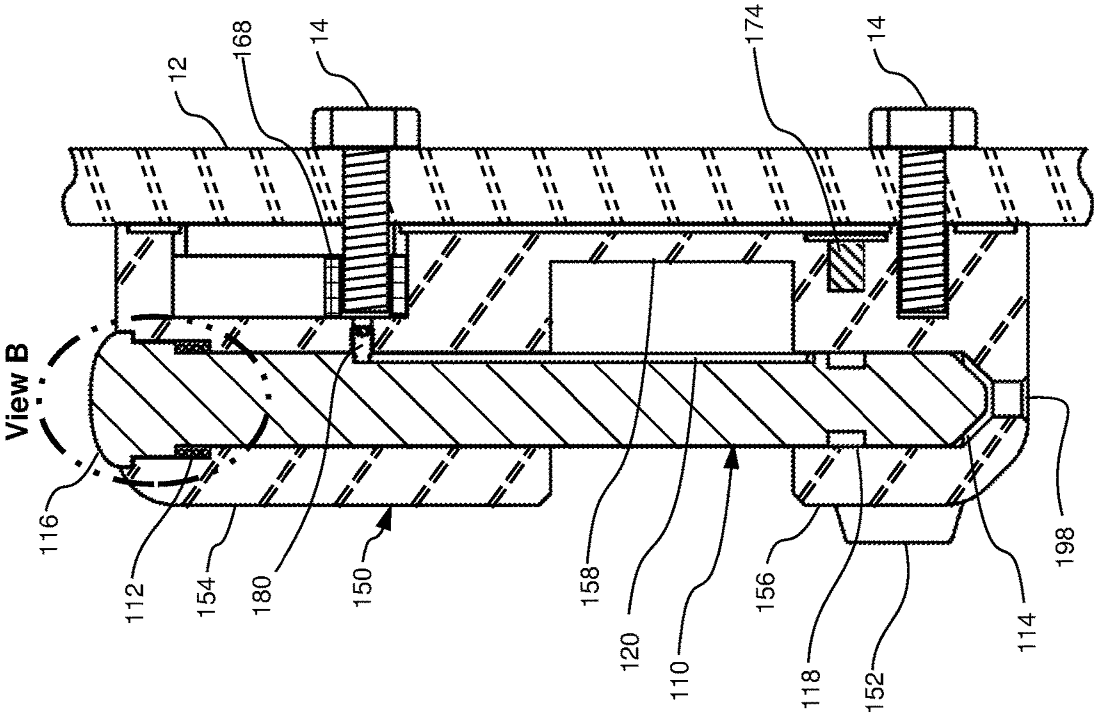
FIG. 4 is section A-A of FIG. 3, mounted on a movable freight container cargo door.
Figure 3:
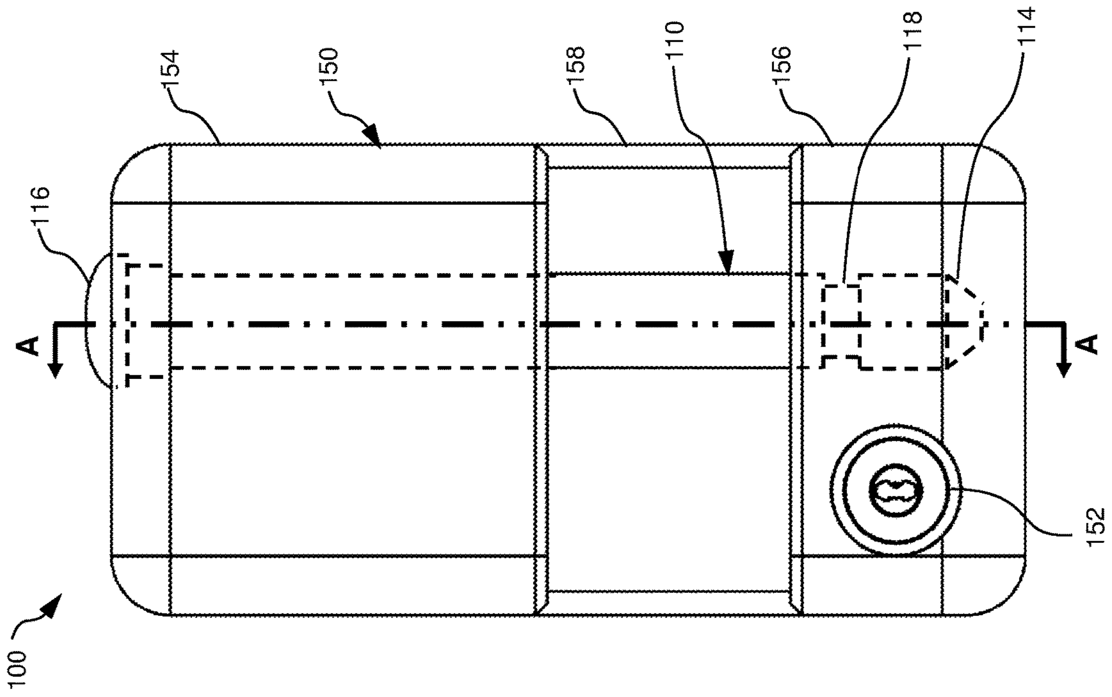
FIG. 3 is a front view of the lock of FIG. 1, without the cam action lock rod handle.
Figure 5B:
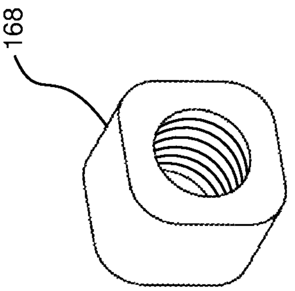
FIG. 5B provides a detailed perspective view of a door attachment nut.
Figure 5A:
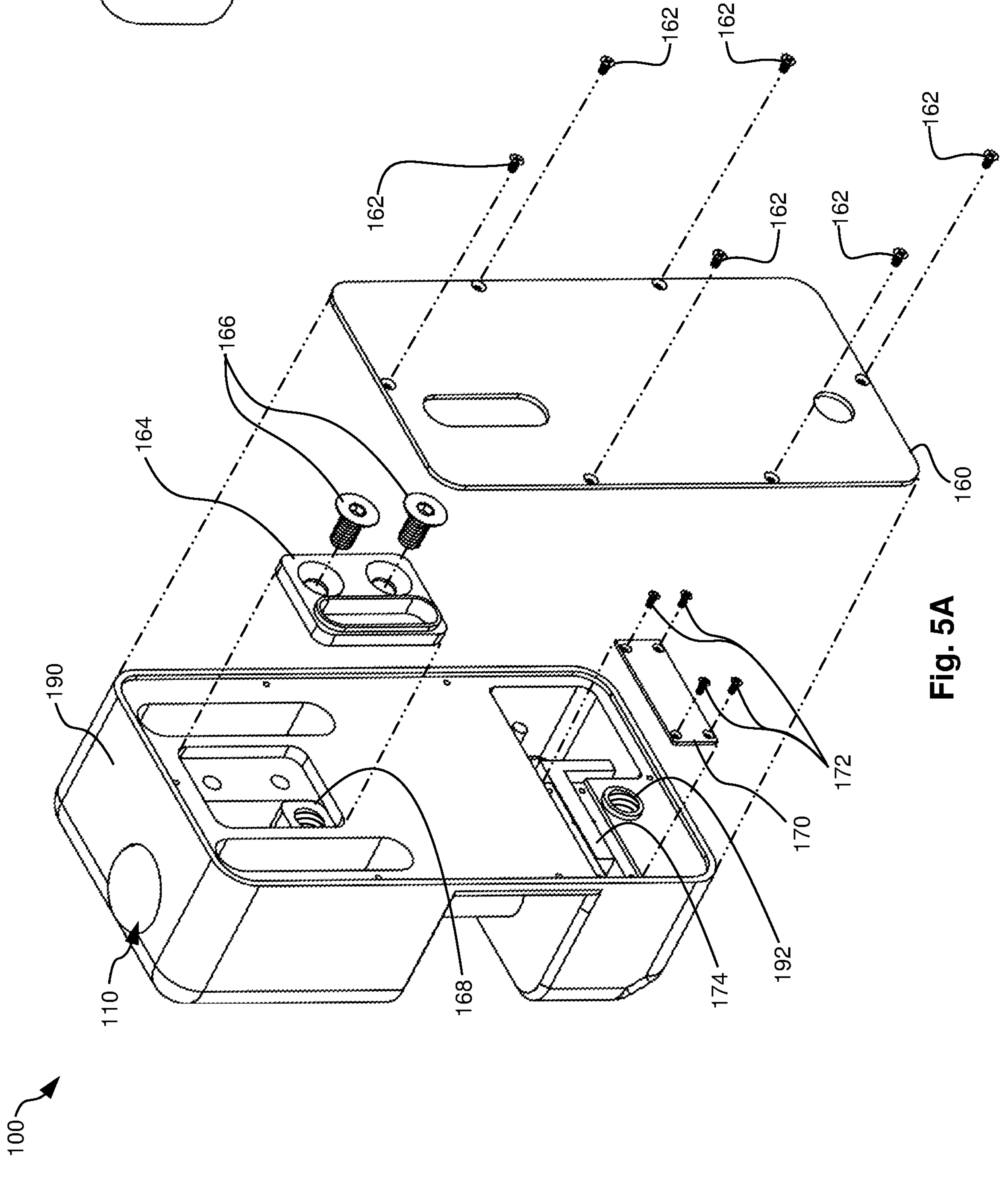
FIG. 5A is a perspective, partially-disassembled exploded rear view of the lock of FIG. 3.
Figure 7:
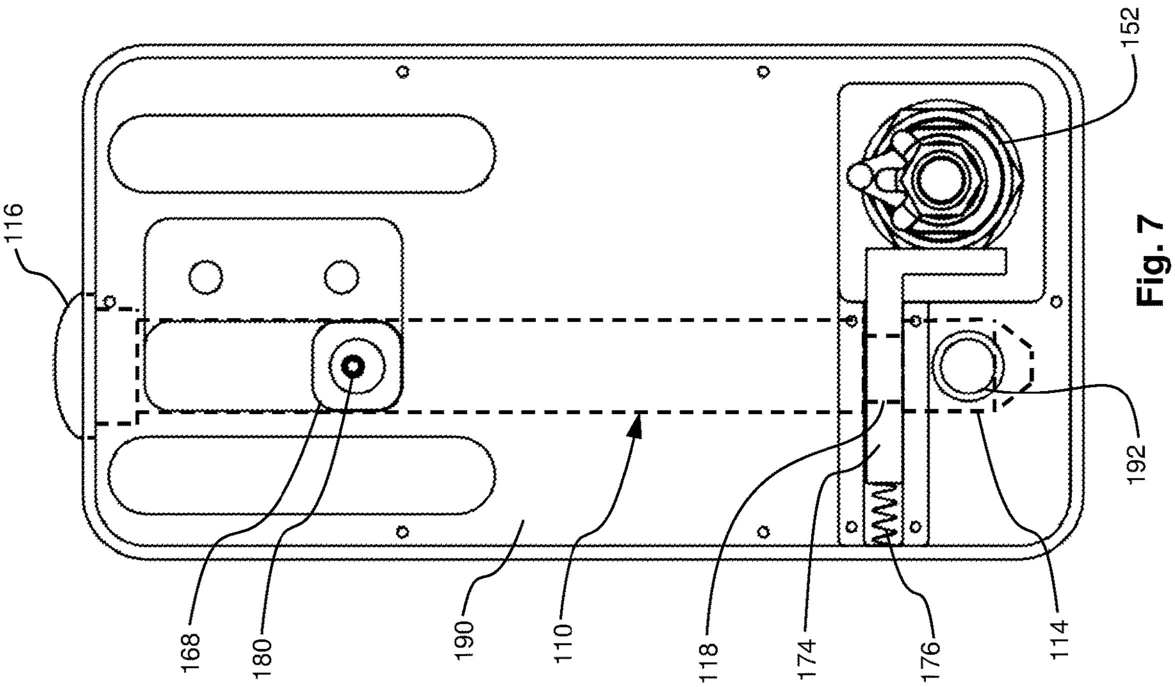
FIG. 7 is a rear view of the lock of FIG. 4 with the covers shown in FIG. 5A removed.
Figure 6:
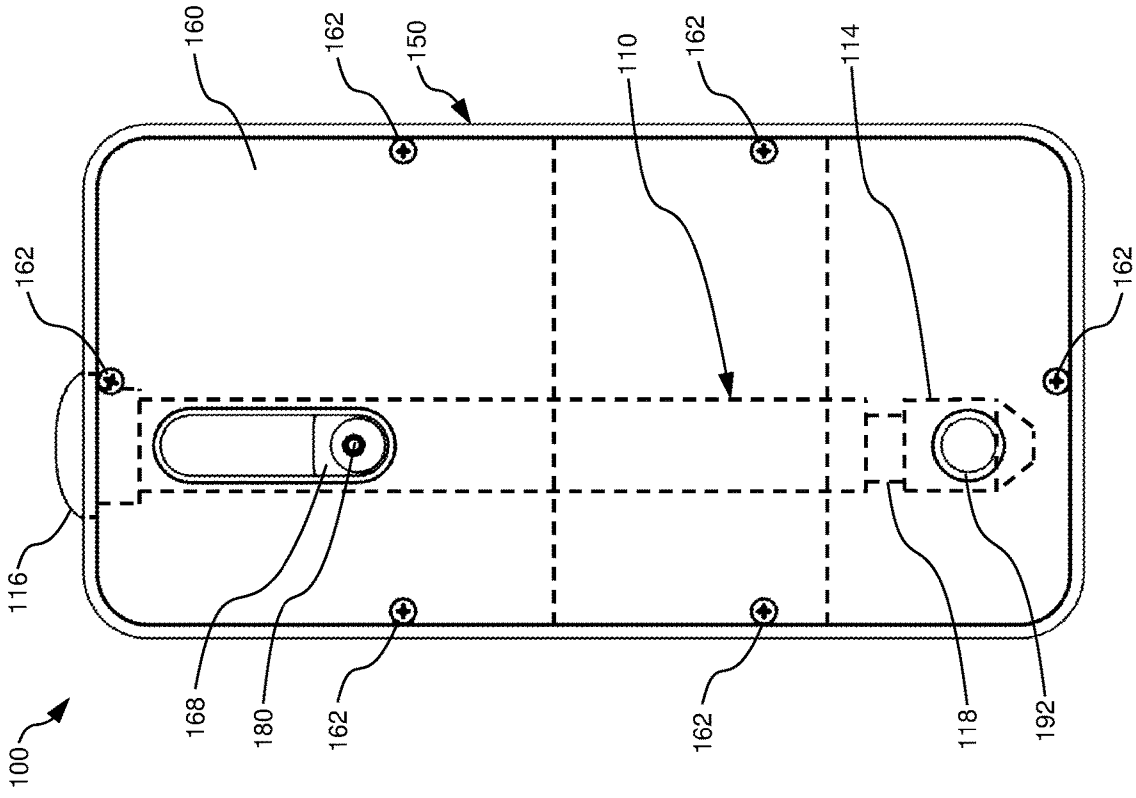
FIG. 6 is a rear view of the lock of FIG. 3.

FIG. 3 is a front view of the lock 100 previously shown in FIG. 1, FIG. 2A, and FIG. 2C. FIG. 4 shows section A-A of FIG. 3, mounted on a movable freight container cargo door. FIG. 5A is a perspective, partially-disassembled exploded rear view of the lock 100 of FIG. 3. FIG. 6 is a rear view of the lock 100 of FIG. 3. FIG. 7 is rear view of the lock of FIG. 3 with the rear covers removed. It should be noted that for purposes of this document and the appended claims, the rear face of the lock 100 is the face of the lock 100 that would be attached to the movable freight container cargo door (12 in FIG. 2A and FIG. 4) when the lock 100 is in use. This rear face of the lock is not visible or accessible when the lock 100 is mounted to the door 12. This makes the rear face a secure part of the lock 100 for access to all parts and features of the lock 100 and for assembly of the lock.

Referring to FIG. 3 and FIG. 4, the lock 100 comprises a c-shaped lock body assembly (which could also be called a casing) 150 and an axially-slidable straight shackle (which could also be called a bolt or pin) 110. The c-shaped lock body assembly 150 comprises a top portion 154 and a bottom portion 156 that are separated by a recess (i.e., the center of the "c"). There is a base portion 158 on the rear of the c-shaped lock body assembly 150 that connects the top portion 154 and bottom portion 156 of the c-shaped lock body. In the configuration shown in FIG. 3, FIG. 4, FIG. 5A, FIG. 6, and FIG. 7, the lock body assembly 150 is oriented vertically, with the recess being a horizontal slot configured for receiving at least part of a cam action lock rod handle of the movable freight container as described previously. In one embodiment, the c-shaped lock body assembly 150 comprises a monolithic lock body block (190 in FIG. 5A, FIG. 6, and FIG. 7) to create the entire structure of the top portion 154, the bottom portion 156, and the base portion 158. Alternatively, the c-shaped lock body assembly could comprise separable parts for the top portion 154, the bottom portion 156, and the base portion 158, with these separable portions being attached to each other using any manufacturing method and assembly technique known to anyone skilled in the art. The c-shaped lock body assembly 150 could comprise a hardened metal, such as a fully hardened steel or a case-hardened steel. The c-shaped lock body assembly 150 could comprise a case-hardened metal exterior over a plastic interior. The c-shaped lock body assembly could comprise any other structure or combination of materials capable of being understood by anyone skilled in the art.

Further referring to FIG. 3, FIG. 4, FIG. 6, and FIG. 7, the axially-slidable straight shackle 110 comprises a tip end 114 and a head end 116, separated by a shaft. The shackle 150 can also be seen at 110 in FIG. 5A. The shackle tip end 114 is configured for insertion into the top of the lock body assembly 150, through an aperture in the lock body top portion 154 across the recess (handle retention region) and into a cavity in the lock body bottom portion 156. By comparing FIG. 1 with FIG. 3 and FIG. 4, it can be understood that the handle 22 shown in FIG. 1 can be securely captured in a lock handle retention region defined by the part of the recess of the c-shaped lock body assembly 150 that is between the shackle 110 and the lock body base portion 158 when the shackle 110 is fully inserted into the lock body 150 assembly. It can be seen that the shackle tip end 114 comprises a frustum region. This frustum region is configured for pushing the shackle lock element, 174 in FIG. 7, against the one or more shackle lock element springs 176 in FIG. 7 when the tip end 114 of the straight shackle 110 is inserted into the lock body.

Referring to FIG. 5A and FIG. 6, the lock body assembly (150 in FIG. 3) comprises a rear cover 160 that is located on a face of the lock body assembly configured for mounting on a movable freight container cargo door (12 in FIG. 2A and FIG. 4). In the embodiment shown in FIG. 5A and FIG. 6 the rear cover 160 is attached to a monolithic lock body block, shown at 190, using six rear cover screws (162 in FIG. 5A). The attachment of the rear cover 160 to other parts of the lock body assembly 150 could be made using any fastener capable of being understood by anyone skilled in the art. It should be noted that all fasteners and other assembly components for assembling and disassembling the locking system are located on the rear face of the lock body. The process of disassembling the locking system begins by removing the rear cover. The process or re-assembling the locking system ends by re-attaching the rear cover. Once the rear of the lock is attached to a movable freight container cargo door, none of the fasteners are accessible from the exterior of a movable freight container.

Further referring to FIG. 5A the lock body assembly (150 in FIG. 3) also comprises a door attachment nut retainer 164 that captures a door attachment nut 168 in a slot of the monolithic lock body block 190. The door attachment nut 168 is more clearly illustrated in FIG. 5B. The door attachment nut retainer 164 is attached to the monolithic lock body block 190 using two door attachment nut retainer screws, shown at 166. FIG. 7 is a perspective rear view of the lock body assembly (150 in FIG. 3) when the rear cover (160 in FIG. 5A) and door attachment nut retainer (164 in FIG. 5A) have been removed to more clearly show the door attachment nut 168 in a door attachment nut slot of the monolithic lock body 190. This door attachment nut 168 is also shown in FIG. 4, FIG. 5A, FIG. 5B, and FIG. 6.

Referring to FIG. 4, FIG. 5A, FIG. 6, and FIG. 7, there are two attachment points that can be used to attach the lock system (100 in FIG. 5A and FIG. 6) to a movable freight container cargo door (12 in FIG. 4) using cargo door attachment bolts (14 in FIG. 4). One of these attachment points is a threaded hole in the monolithic lock body block, shown at 192. The second of these attachment points is the door attachment nut 168, described previously. These two attachment points can be accessed through a hole and a slot in the rear cover 160. The door attachment nut 168 can slide up and down in a slot in the monolithic lock body block 190, to facilitate different bolt spacing for the holes in the cargo door. The door attachment nut retainer 164 holds the door attachment nut 168 in this slot in the monolithic lock body block 190.

Further referring to FIG. 5A the lock body assembly (150 in FIG. 3) also comprises a shackle lock element cover 170 that covers a shackle lock element 174. The shackle lock element cover 170 is attached to the monolithic lock body block 190 using four shackle lock element cover screws, shown at 172. The shackle lock element 174 is also shown in FIG. 4, FIG. 7, FIG. 8, FIG. 9, FIG. 10, and FIG. 11. More detail about the function of the shackle lock element 174 will be provided later in this document.

Figure 8:
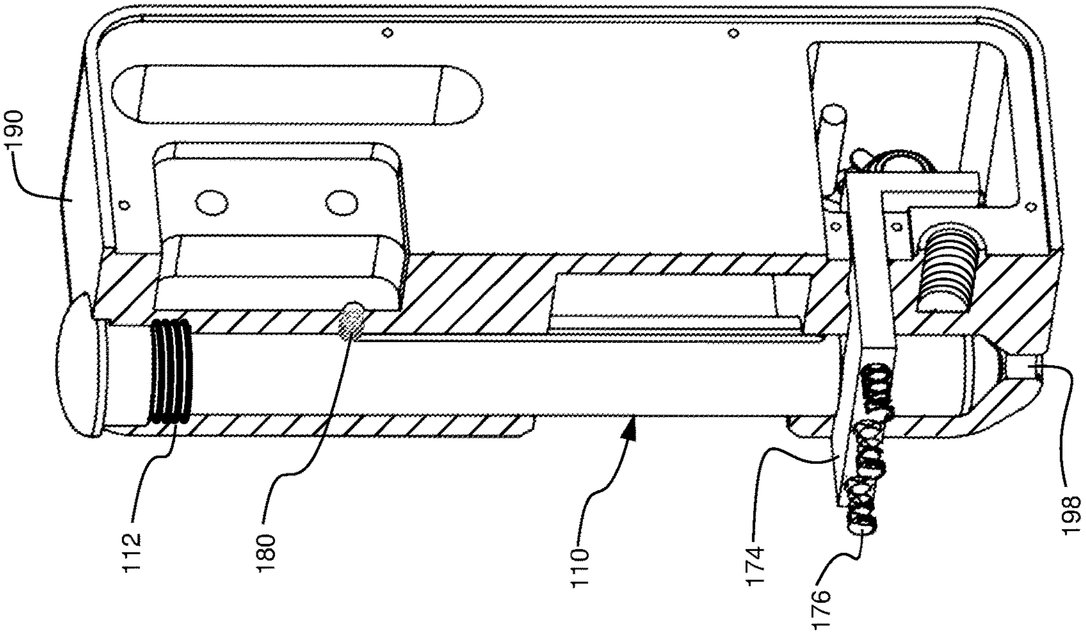
FIG. 8 is a perspective view of FIG. 7 with the monolithic lock body sectioned.

FIG. 8 is a perspective view of the components shown in FIG. 7 with the monolithic block 190 sectioned to show some of the interior components of the lock of FIG. 3. Referring to FIG. 4, FIG. 6, FIG. 7, FIG. 8, FIG. 10, and FIG. 11, a set screw is shown at 180. This set screw 180 is threaded into the top portion of the monolithic lock body 190 and serves as a stop to limit the movement of the shackle and more specifically to prevent the shackle from being completely removed. The end of the set screw 180 fits into a slot 120 that runs partway along a longitudinal axis of the shackle. This shackle longitudinal slot can be seen more clearly at 120 in FIG. 10, FIG. 11A and FIG. 11B, and these figures also show the set screw 180 in the shackle longitudinal slot 120.

Figure 9:
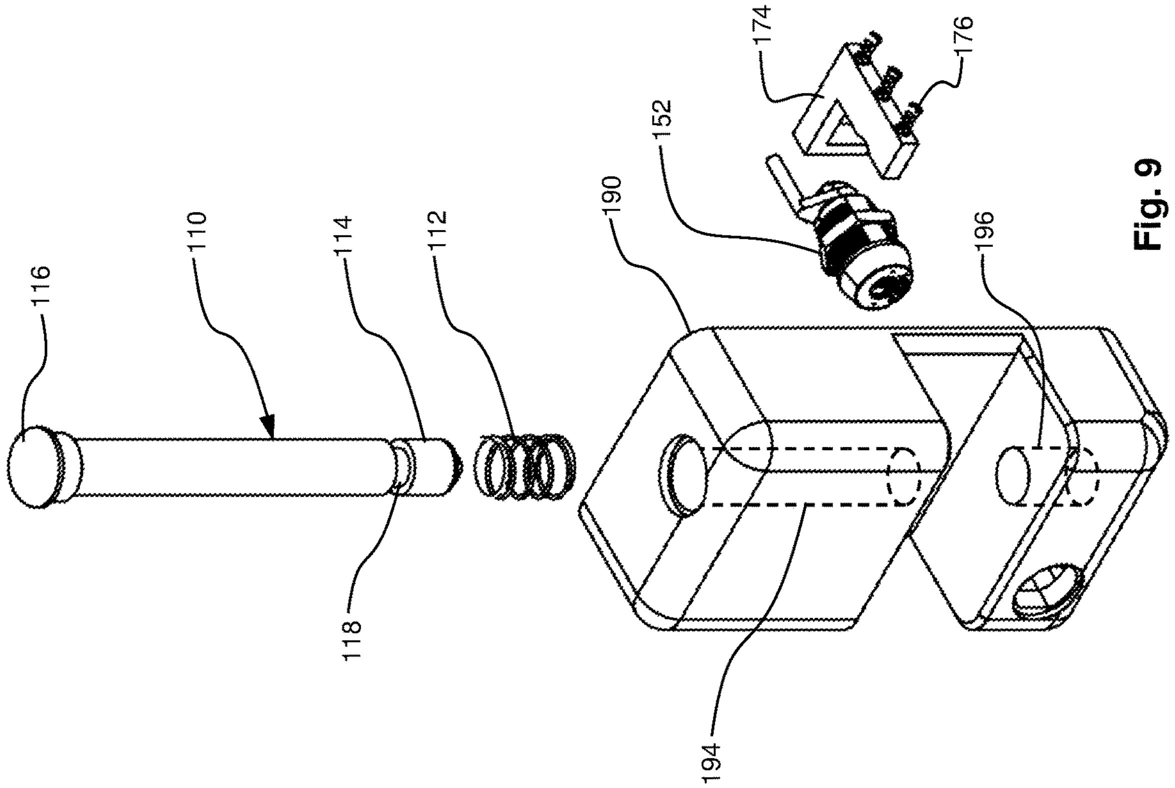
FIG. 9 is a front perspective exploded view of a configuration similar to FIG. 7.

FIG. 9 is a front perspective exploded view of a configuration similar to FIG. 7. In this view, the shackle 110 and shackle release spring 112 have been completely removed from the monolithic lock body block 190. As described previously, the shackle 110 comprises a head end 116 and a tip end 114, separated by a shaft. The lock body aperture 194 that runs through the entire upper portion of the lock body and the cavity, and lock body cavity 196 in the bottom portion of the lock body are indicated with hidden lines in FIG. 9. From FIG. 9, it can be understood that lock body aperture 194 is configured for axially sliding at least a portion of the shackle through into and out of the lock body and that the lock body cavity 194 is configured for holding the shackle tip end 114 when the shackle 110 is fully inserted into the lock body. The lock body cavity 194 could have a small opening opposite its main opening, as shown at 198 in FIG. 4 and FIG. 8 or it could have no opening other than its main opening.

From FIG. 9 it can be seen that the embodiment of the shackle 110 comprises a groove 118, and more specifically a circumferential groove near the tip 114 of the shackle 110. This groove 118 is configured to engage with the shackle lock element 174 when the shackle 110 is fully inserted into the lock body. The shackle circumferential groove 118 can also be seen in FIG. 3, FIG. 4, FIG. 6, FIG. 7, FIG. 10, FIG. 11A, and FIG. 11B. By looking at the shackle lock element 174 in FIG. 5A, FIG. 7, FIG. 8, FIG. 9, FIG. 10, FIG. 11A, and FIG. 11B, it can be understood how the shackle lock element 174 fits into the shackle groove to lock the shackle 110 in position. Note that the groove does not need to be circumferential, the groove 118 only needs to be in the region that engages with the shackle lock element 174. The groove 118 is perpendicular to the axis of movement of the shackle 110 (i.e., perpendicular to the shaft of the shackle). The term perpendicular, in this context and in the description of the embodiments and claims, is meant to identify that the groove runs in a direction that prevents axial movement of the shackle.

FIG. 7, FIG. 8, and FIG. 9 show one or more shackle lock element springs 176. As shown in FIG. 7, these shackle lock element springs 176 press against an inside wall of the lock body 190 to bias the shackle lock element 174 into the groove 118. The point on the shackle tip end 114 slides the shackle lock element 174 out of the way when the shackle 110 is inserted into the cavity in order to engage with the groove 118 and lock the shackle.

FIG. 7 also shows the lock cylinder 152 that is also shown in FIG. 1 and FIG. 2C, FIG. 3, FIG. 4, FIG. 9, FIG. 10, FIG. 11A, and FIG. 11B. The lock cylinder 152 in these illustrations comprises a rotating mechanical lock cylinder 152 configured to be turned by a user with a key. It should also be noted that the axis of rotation of the lock cylinder 152 is perpendicular and offset to the axis of motion for sliding the shackle 110, perpendicular to the direction of motion for the shackle lock element 174, and parallel to an engagement region of the shackle lock element 174 into the groove 118 in the straight shackle. By looking carefully at FIG. 11A and FIG. 11B, one can see that the rotation of a lock cylinder actuator 178 causes the shackle lock element 174 to move out of the groove 118 in the shackle. This can also be seen by observing that the one or more shackle lock element springs 176 become compressed as the shackle lock element 174 is moved rightwards in FIG. 11B as a result of a rotation of the lock cylinder actuator 178.

Figure 10:
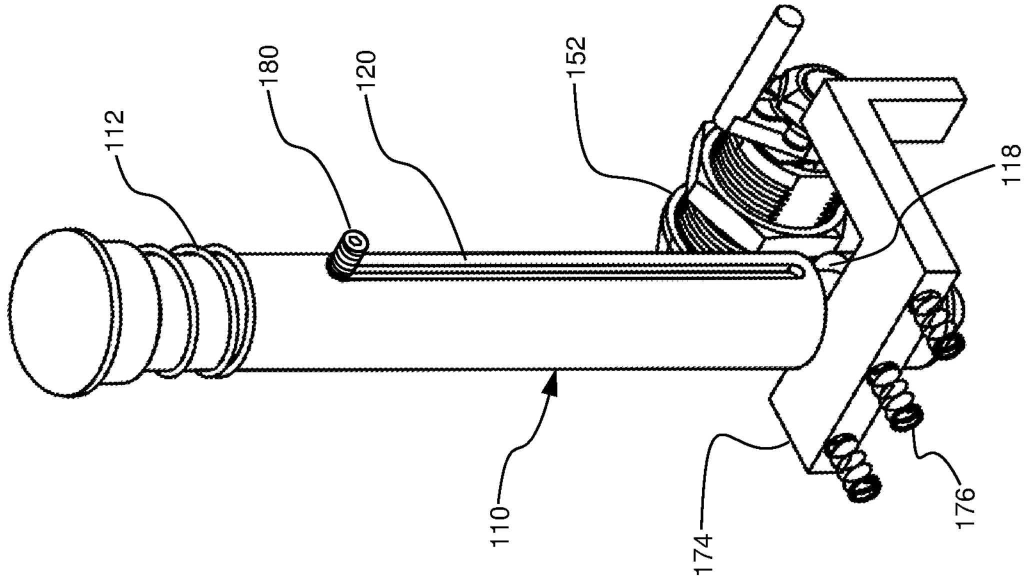
FIG. 10 is a perspective view of the shackle and related parts for the lock of FIG. 1.

FIG. 10 most clearly shows how shackle axial movement is limited by a set screw 180 that rides in the longitudinal slot 120 in the shaft of the shackle. The slot 120 is typically on the rear of the shackle 110, where the rear of the shackle 110 is defined as that part of the shackle that is closest to the rear cover (160 in FIG. 5A) and movable freight container cargo door (12 in FIG. 2A and FIG. 4). The set screw 180 can also be seen in FIG. 4, FIG. 6, FIG.

Figure 11A:
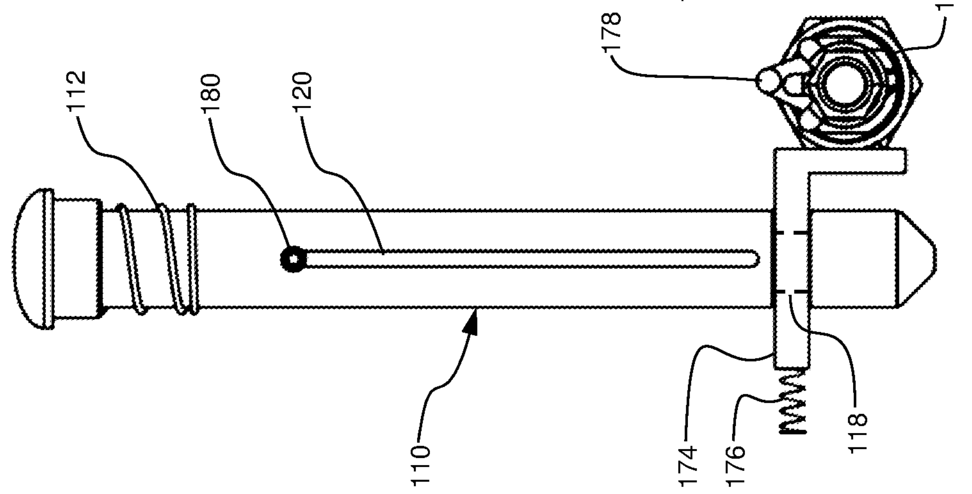
FIG. 11A is a rear view of the components shown in FIG. 10.
Figure 11B:
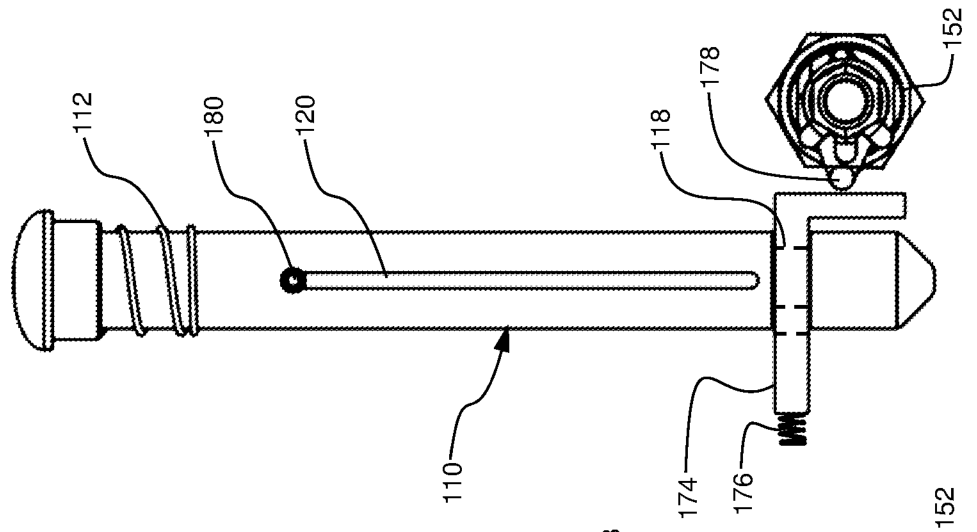
FIG. 11B shows the view of FIG. 11A in position that unlocks the shackle.

7, FIG. 8, FIG. 11A, and FIG. 11B. The longitudinal slot, can also be seen in FIG. 11A and FIG. 11B. As can most clearly be seen in FIG. 4, the slot 120 in the shackle 110 runs along a part of the shackle 110 allowing the shackle tip end 114 to move out of the cavity in the lower portion of the lock body and out of the way of the handle retention region, but prevents complete removal of the shackle 110 from the top portion of the lock body when the locking system is attached the movable cargo container door.

4. Alternate Shackle Head Shapes

Figure 12B:
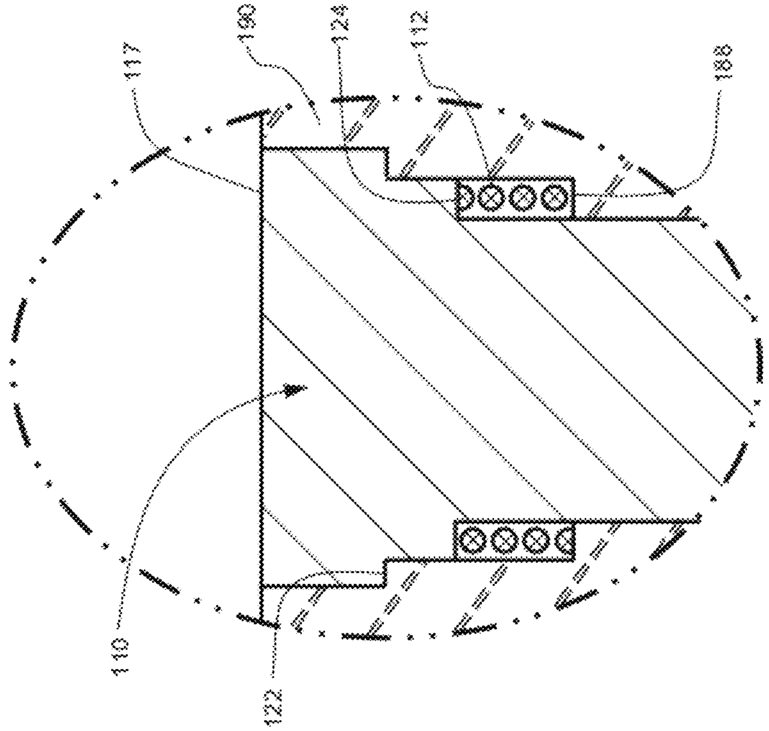
FIG. 12B shows an alternate shackle head embodiment from FIG. 12B.
Figure 12A:
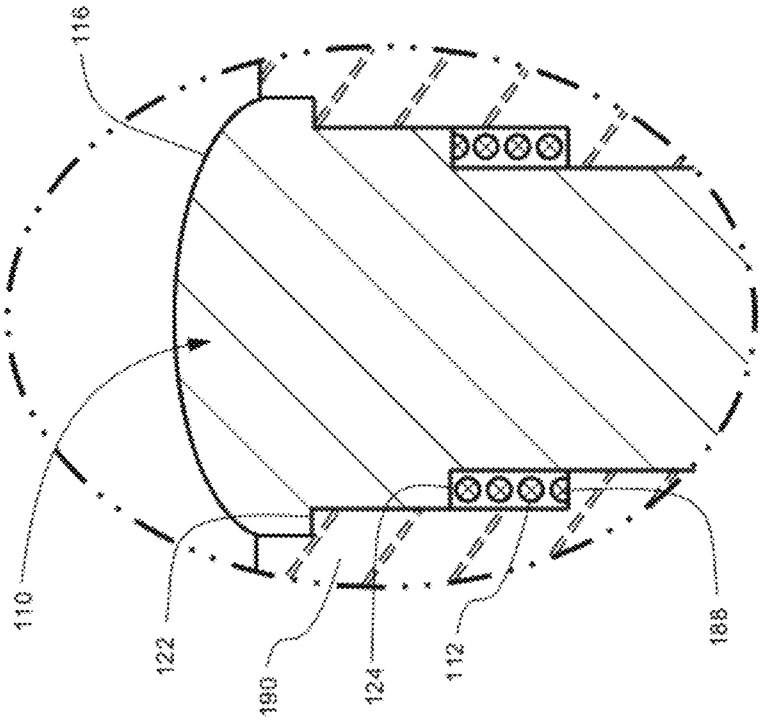
FIG. 12A shows more detail of View B of FIG. 4.

FIG. 12A shows more detail of View B section that was shown in FIG. 4. In this view, the shackle head end 116 has a domed shape. As an alternative, the shackle could have a flat shaped head, as shown at 117 in the view shown in FIG. 12B. Referring to both FIG. 12A and FIG. 12B, the lock body is shown sectioned at 190. There is an axial stop, shown at 122, that limits the depth that the shackle can slide into the lock body. This axial shackle to lock body stop 122 is located below the surface of the lock body to prevent the shackle from being pried out of the lock body at the head of the lock body (116 or 117). The shackle release spring 112, that was also shown in FIG. 4, sits around the cylindrical shackle near its head end, 116 or 117, between a shackle release spring shoulder 124 on the shackle and a counter-bored shackle release spring seat 188 in the lock body 190

5. Alternative Locations for the Locking Module

Figure 14:
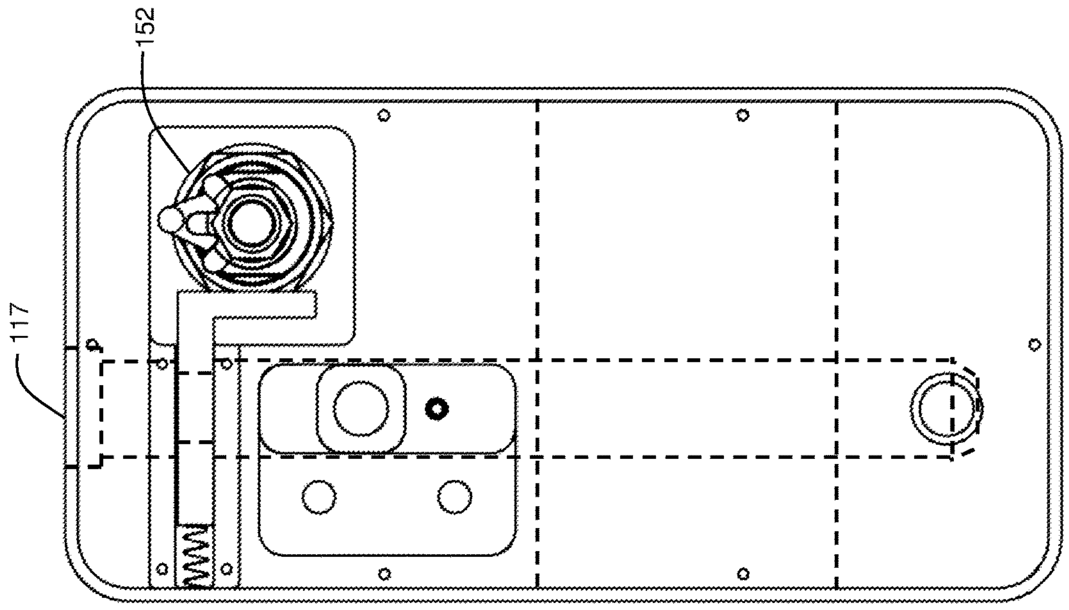
FIG. 14 is a rear view of the lock of FIG. 13 without the rear covers.
Figure 13:
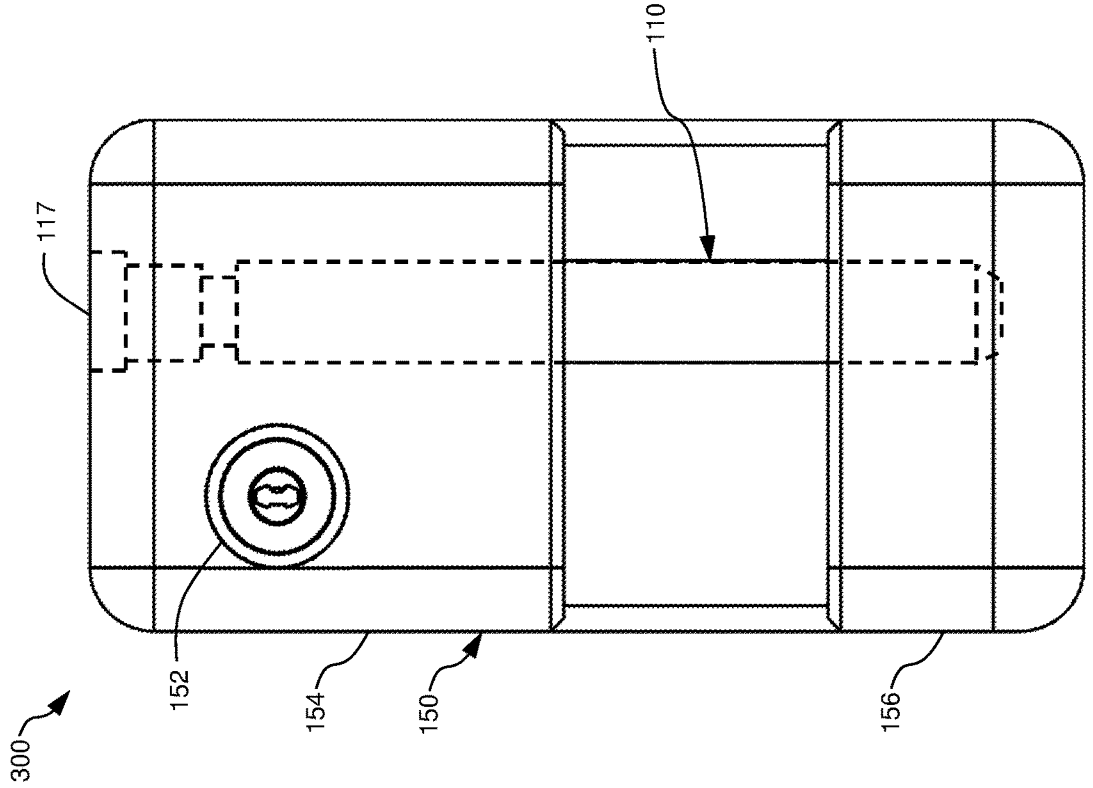
FIG. 13 is an alternate embodiment of the lock of FIG. 1 in with the lock cylinder in the upper portion of the lock body.

The configuration shown in FIG. 1 and FIG. 2C to FIG. 12B has the lock cylinder (shown as 152 in FIG. 3) located in the portion of the lock body closest to the tip of the shackle (shown at 114 in FIG. 3). As illustrated in FIG. 13 and FIG. 14, it is also possible to locate the lock cylinder 152 in the portion of the lock body 150 closes to the head of the shackle 117. This alternate configuration lock 300 is shown as a front view in FIG. 13. FIG. 14 shows a rear view of this alternate configuration with the rear covers removed. One advantage of this alternate configuration 300 is that a thief would need to cut the shackle 110 twice to remove enough of the shackle 110 to release the door handle (shown at 22 in FIG. 1) from the door handle retention region that is located between the top portion 154 and the bottom portion 156 of the lock body.

6. Applicability to Alternate Movable Freight Container Cargo Doors

Figure 15:
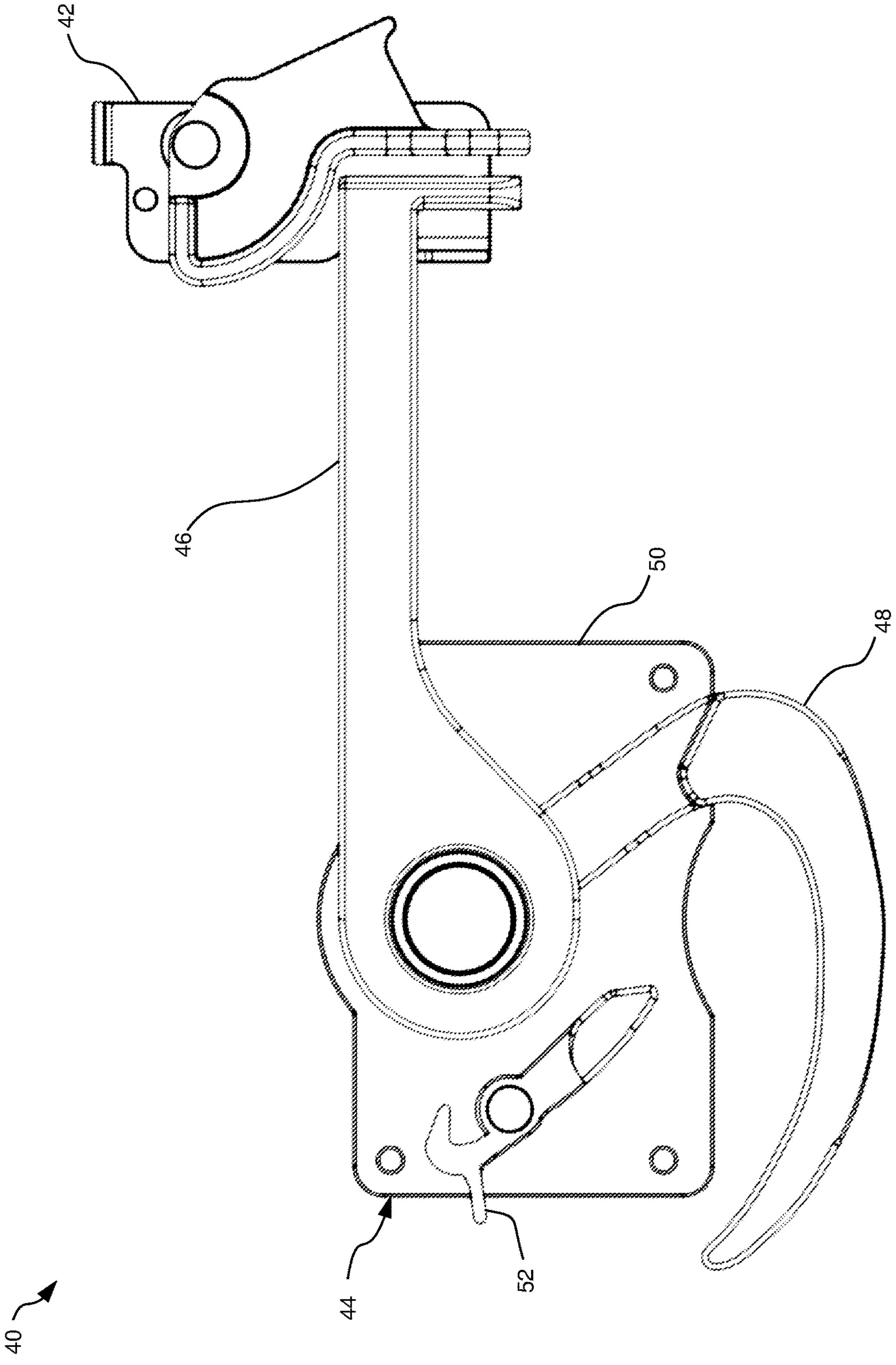
Fig. 15 (Prior Art)
FIG. 15 shows a prior art roll up cargo door locking system.

A lock with the elements and features described herein can also be used for other types of movable freight container cargo doors. For example, those skilled in the art will be aware of the overhead cargo doors for movable freight containers that roll up from the bottom. FIG. 15 shows a typical prior art latching system for such a roll-up cargo door at 40. Such roll-up cargo door systems typically comprise a prior art roll-up door lock keeper, shown at 42, that engages with a roll-up door latch assembly, shown at 44. The roll-up door latch assembly 44 typically comprises roll-up door latch mounting plate, shown at 50, a roll-up door latch handle 46, a roll-up door latch cam hook 48, and a roll-up door latch handle retainer, shown at 52. The mounting plate 50 and keeper 42 are configured to be mounted to the roll-up cargo door (also known as an overhead door) of a movable freight container. The latch handle 46 and cam hook 48 are rotationally coupled to each other and rotate about a pivot on the mounting plate 50 to engage or disengage that cam hook 48 from a fixed part of the movable freight container (typically called a latch plate). The latch handle retainer 52 is used to retain the latch handle 46 and cam hook 48 in an open position to facilitate rolling the overhead cargo door that they are attached to up and down. The distal end of the latch handle 48 can be retained by the keeper 42 to latch the overhead cargo door closed. Typically, in the prior art, a padlock is used to secure a through hole in the distal end of the latch handle 48 to the roll-up door keeper 42.

Figure 16:
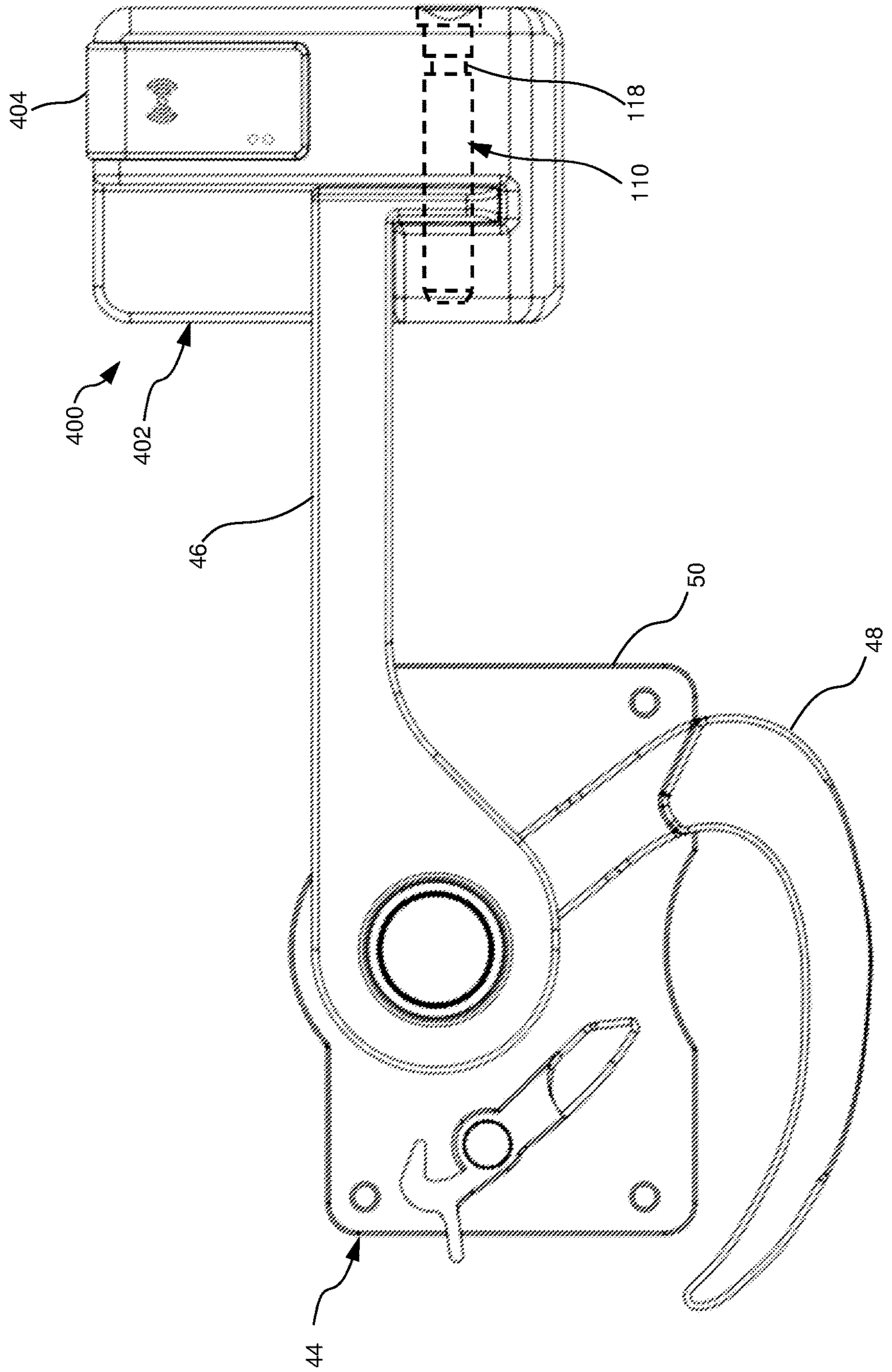
FIG. 16 shows an alternate embodiment of the lock of FIG. 1 for a rollup carbo door.
Figure 17:
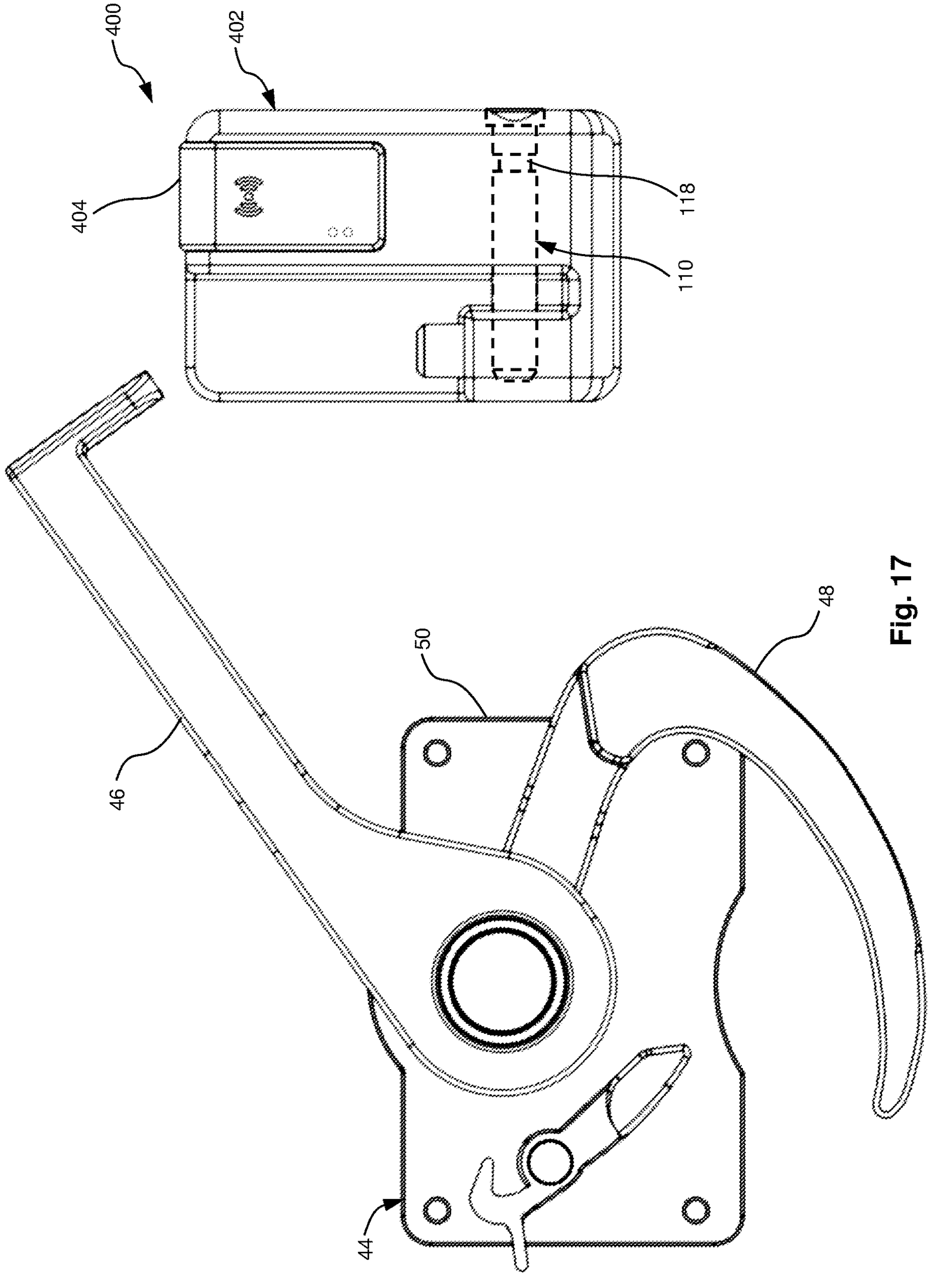
FIG. 17 shows the lock of FIG. 16 in an unlocked position.

FIG. 16 shows how an embodiment of the present invention can be used to replace the keeper that was shown in FIG. 15 in a locked position and FIG. 17 shows this roll-up door lock system in an unlocked position. The latch assembly 44, latch handle 46, latch cam hook 48, latch mounting plate 50, and latch handle retainer are the same in the embodiment shown in FIG. 16 and FIG. 17 as the embodiment shown in FIG. 15. The embodiment of a lock for a roll-up movable freight container cargo door shown at 400 in FIG. 16 and FIG. 17. has been configured to fit with the roll-up door latch assembly 44, latch handle 46, latch cam hook 48, latch mounting plate 50, and latch handle retainer 50 that were shown and described in further detail with reference to FIG. 15.

Referring now to FIG. 16 and FIG. 17, based on what has been described for other embodiments shown in FIG. 1 to FIG. 14, the lock shown at 400 comprises a generally c-shaped lock body that has a first portion and a second portion that are horizontal to each other. There is a straight shackle, shown at 110 that goes through an aperture in the first portion, across a handle retention region and into a cavity in the second portion. Note that the shackle 110 shown in FIG. 16 and FIG. 17 is always fully inserted, even when the handle is released, just like it was in FIG. 1 and FIG. 3. Also note that the groove 118 in the shackle 110 is in the portion of the horizontal lock body 402 that is closest to the head of the shackle 110, like it was for the embodiment 300 shown in FIG. 13, components of which were shown in FIG. 14.

It is also important to identify that the lock body 402 in FIG. 16 and FIG. 17 uses an electronic lock module 404. Embodiments of the inventions described herein could use any lock module capable of being understood by anyone skilled in the art including the mechanical lock cylinder (152 in FIG. 1, FIG. 2C, FIG. 3, FIG. 4, FIG. 7, FIG. 9, FIG. 10, FIG. 11A, FIG. 11B and FIG. 13). Embodiments could use an electronic lock module (404 in FIG. 16 and FIG. 17). Embodiments could use both a mechanical lock and an electronic lock. Not shown in FIG. 16 and FIG. 17 is a shackle axial movement limiter function implemented with the longitudinal slot (shown most clearly at 120 in FIG. 10) and set screw (180 in FIG. 10). However, it can be understood that this configuration could be added to the lock shown at 400 in FIG. 16 and FIG. 17. Similarly, it can be understood that the lock shown at 400 in FIG. 16 and FIG. 17 could comprise a shackle release spring (shown at 112 in FIG. 4, FIG. 8, FIG. 9, FIG. 10, FIG. 11A, FIG. 11B, FIG. 12A, and FIG. 12B).

A number of variations and modifications of the disclosed embodiments can also be used. While the principles of the disclosure have been described above in connection with specific apparatuses and methods, it is to be clearly understood that this description is made only by way of example and not as limitation on the scope of the disclosure.

What is claimed is:

1. A locking system wherein:

the locking system is configured for permanent attachment to a movable freight container cargo door;

the locking system comprises a lock body and a straight shackle;

the straight shackle comprises a head end, a tip end, and a shaft;

the straight shackle is configured for sliding into and out of at least a portion of the lock body;

the lock body is c-shaped, comprising a lock body first portion, a lock body second portion, and a lock body base portion wherein:

the lock body first portion and the lock body second portion are connected to two ends of the lock body base portion to form the c-shape of the lock body;

the lock body base portion is configured for permanent attachment to the movable freight container cargo door;

the lock body first portion and the lock body second portion are separated by a movable freight container cargo door handle retention region; and the movable freight container cargo door handle retention region is located on the side of the c-shaped lock body opposite of the movable freight container cargo door;

the movable freight container cargo door handle retention region comprises a recess of the c-shaped lock body between the lock body first portion and the lock body second portion;

the lock body first portion comprises an aperture configured for axially sliding at least a portion of the straight shackle into and out of the lock body;

the lock body second portion comprises a cavity for holding the tip end of the straight shackle when the straight shackle is fully inserted into the lock body;

the system is configured for:

locking the movable freight container cargo door when:

the straight shackle is inserted into the aperture;

the straight shackle spans across the handle retention region;

at least part of the movable freight container cargo door handle is captured in the handle retention region between the straight shackle and the lock body base portion; and the tip end of the straight shackle is inserted into the cavity of the lock body second portion; and releasing the handle when the straight shackle does not span across the handle retention region; and the straight shackle comprises a shackle groove configured for engagement with a shackle lock element located in the lock body, wherein:

the shaft of the straight shackle cannot be moved to a position that would allow the moveable freight container cargo door handle to be released when the shackle lock element is engaged with the shackle groove;

the shackle groove is perpendicular to the axis of the shaft of the straight shackle in a direction that prevents axial movement of the straight shackle when the shackle lock element is engaged with the shackle groove;

the shackle lock element is configured for linear motion in a direction perpendicular to the shaft of the straight shackle and perpendicular to the shackle groove;

the shackle lock element is responsive to a rotating lock cylinder attached to the lock body.

2. The locking system of claim 1 wherein:

the locking system is configured for permanent attachment to the movable freight container cargo door by means of a plurality of fasteners through the movable freight container cargo door;

the plurality of fasteners through the movable freight container door for engaging with the lock body comprise bolts;

the straight shackle comprises a straight cylindrical shackle;

the shackle groove comprises a circumferential groove in the straight cylindrical shackle;

the rotating lock cylinder comprises a mechanical lock cylinder configured to be turned by a user with a key;

the axis of rotation of the rotating lock cylinder is:

perpendicular and offset from the shaft of the straight shackle;

perpendicular to the direction of motion of the shackle lock element; and parallel and offset from an engagement region of the shackle lock element into the groove in the straight shackle;

the shackle lock element is configured to be held in the shackle groove with one or more shackle lock element springs that press the shackle lock element against the straight shackle;

the shackle lock element is configured to be released from the shackle groove in response to a rotation of the mechanical lock cylinder;

the tip of the shackle comprises a frustum region configured for pushing the shackle lock element against the one or more shackle lock element springs when the tip end of the straight shackle is inserted into the lock body;

the system further comprises a shackle release spring wherein:

the shackle release spring sits on an outside circumference of the straight circumferential shackle proximate to the head end of the straight shackle and inside the lock body first portion aperture when the straight shackle is fully inserted into the lock body; and the shackle release spring is configured to push at least a portion of the straight shackle out of the lock body when the straight shackle is released in response to the shackle lock element being released from the shackle groove in response to a rotation of the rotating lock cylinder;

the lock body first portion comprises a shackle axial movement limiter configured for preventing complete removal of the straight shackle from the lock body first portion when the locking system is attached to the movable freight container cargo door;

the shackle axial motion limiter comprises a longitudinal slot in the shaft of the straight shackle;

the longitudinal slot is configured to be located on a rear side of the straight shackle wherein the rear side of the shackle is the side of the straight shackle closest to the movable freight container cargo door when the lock body is mounted on the movable freight container cargo door;

the longitudinal slot in the straight shackle is configured to engage with a shackle axial motion limiter stop;

the shackle axial motion limiter stop is configured to be mounted in the lock body;

the shackle axial motion limiter stop comprises a shackle retainer screw;

the shackle retainer screw is configured to be accessible from a rear side of the lock body.

3. The locking system of claim 2 wherein:

the lock body first portion, lock body second portion, and lock body base portion comprise a monolithic metal unit;

the lock body first portion aperture comprises a stop that limits the depth that the straight shackle can slide into the lock body and said stop is below the surface of the lock body first portion;

the lock body is configured for permanent attachment to the movable freight container door by using pre-existing hole locations in the movable freight container door;

permanent attachment to the movable freight container door comprises a door attachment nut located in the lock body wherein the door attachment nut is retained within a door attachment nut slot in the lock body;

all fasteners for assembling and disassembling the locking system are located on a rear face of the lock body wherein the rear face of the lock body is configured to be inaccessible when the lock body is attached to the movable freight container cargo door.

4. The locking system of claim 1 wherein:

the shackle groove is located proximate to the tip end of the straight shackle; and the rotating lock cylinder is located in the second portion of the lock body.

5. The locking system of claim 1 wherein:

the shackle groove is located proximate to the head end of the shackle; and the rotating lock cylinder is located in the first portion of the lock body.

6. The locking system of claim 1 wherein:

the handle for closing the movable freight container cargo door comprises a cam action lock rod handle; and permanent attachment to the movable freight container door comprises a vertical lock body orientation in which the lock body first portion is at the top of the lock body and the lock body second portion is at the bottom of the lock body when the lock body is permanently attached to the movable freight container cargo door.

7. The locking system of claim 1 wherein:

the lock body first portion aperture comprises a stop that limits the depth that the straight shackle can slide into the lock body and said stop is below the surface of the lock body first portion.

8. The locking system of claim 1 wherein:

the straight shackle comprises a straight cylindrical shackle;

the shackle groove comprises a circumferential groove in the straight cylindrical shackle; and the axis of rotation of the rotating lock cylinder is perpendicular to the axis for sliding the straight shackle and offset from the axis for sliding the straight shackle.

9. The locking system of claim 1 wherein:

the lock body first portion comprises a shackle axial movement limiter configured for preventing complete removal of the straight shackle from the lock body first portion when the locking system is attached to the movable freight container cargo door;

the shackle axial motion limiter comprises a longitudinal slot in the straight shackle wherein;

the longitudinal slot is configured to be located on a rear side of the straight shackle wherein the rear side of the shackle is the side of the straight shackle closest to the movable freight container cargo door when the lock body is mounted on the movable freight container cargo door;

the longitudinal slot in the straight shackle is configured to engage with a shackle axial motion limiter stop;

the shackle axial motion limiter stop is configured to be mounted in the lock body; and the shackle axial motion limiter stop comprises a shackle retainer screw.

10. The locking system of claim 1 wherein:

all fasteners for assembling and disassembling the locking system are located on a rear face of the lock body wherein the rear face of the lock body is configured to be inaccessible when the lock body is attached to the movable freight container cargo door.

11. The locking system of claim 1 wherein:

the lock body comprises a case-hardened metal shell; and internal components of the lock body are separable from the case-hardened metal shell.

12. The locking system of claim 1 wherein:

the straight shackle comprises a straight cylindrical shackle;

the shackle groove comprises a circumferential groove in the straight cylindrical shackle;

the axis of rotation of the rotating lock cylinder is perpendicular to the axis for sliding the straight shackle and offset from the axis for sliding the straight shackle;

the shackle lock element is configured to be held in the shackle groove with one or more shackle lock element springs that press the shackle lock element against the straight shackle; and the shackle lock element is configured to be released from the shackle groove in response to a rotation of the rotating lock cylinder.

13. The locking system of claim 1 wherein:

the lock body is configured for permanent attachment to the movable freight container door by means of pre-existing hole locations in the movable freight container door; and permanent attachment to the movable freight container door comprises a door attachment nut located in the lock body wherein the door attachment nut is retained within a door attachment nut slot in the lock body.

14. A lock configured for permanent attachment to a movable freight container cargo door, wherein:

the lock comprises a c-shaped lock body and a straight shackle;

the lock comprises a recess of the c-shaped lock body between a lock body first region and a lock body second region wherein said recess is configured for receiving a moveable freight container cargo door handle;

the lock body first region and the lock body second region are connected to two ends of a lock body base region to form the c-shape of the lock body;

the straight shackle comprises a head end separated from a tip end by a shaft;

the shaft of the straight shackle is configured for axially sliding through an aperture in the lock body first region, across the moveable freight container door handle retention region, and into at least part of the lock body second region;

the system is configured for:

locking the movable freight container cargo door when the moveable freight container door handle is placed in the handle retention region and the shaft of the straight shackle spans across said handle retention region; and releasing the handle when the shaft of the straight shackle does not span across said handle retention region; and the straight shackle comprises a shackle groove configured for engagement with a shackle lock module wherein:

the shackle lock module is located in the c-shaped lock body;

the shaft of the straight shackle cannot be moved to a position that would allow the handle to be released when at least part of the shackle lock module is engaged with the shackle groove; and the shaft of the straight shackle can be moved out of the path of the handle when the part of the shackle lock module is not engaged with the shackle groove.

15. The lock of claim 14, wherein:

the shaft of the shackle is cylindrical;

the shackle lock module comprises a rotatable mechanical lock cylinder located in the c-shaped lock body and configured to be turned by a user with a key;

the axis of rotation of the rotatable mechanical lock cylinder is:

perpendicular and offset from the central axis of the cylindrical shaft of the shackle; and perpendicular to the direction of motion of the part of the shackle lock module that engages the shackle groove.

16. The lock of claim 14, wherein:

the lock body first portion comprises a shackle axial movement limiter configured for preventing complete removal of the straight shackle from the lock body first portion when the locking system is attached to the movable freight container cargo door;

the shackle axial motion limiter comprises a longitudinal slot that runs parallel to the central axis of the shackle, along at least part of the length of a rear side of the shackle wherein the rear side of the shackle is the side of the shackle closest to the movable freight container cargo door when the lock body is mounted on the movable freight container cargo door and the shackle is at least partially inserted into the lock body;

the longitudinal slot in the shackle is configured to engage with a shackle axial motion limiter stop;

the shackle axial motion limiter stop is configured to be mounted in the lock body;

the shackle axial motion limiter stop comprises a screw.

17. The lock of claim 14, wherein:

permanent attachment to the movable freight container door comprises a door attachment nut located in the lock body wherein the door attachment nut is retained within a door attachment nut slot in the lock body.

18. The lock of claim 14, wherein:

the shackle lock module comprises an electronic lock module.

19. A locking method comprising the steps of:

establishing a lock that comprises a c-shaped lock body and a straight shackle, wherein the straight shackle comprises a head end separated from a tip end by a shaft;

permanently attaching the lock body to a movable freight container cargo door;

sliding the straight shackle:

into a lock body first portion located at one end of the c-shaped lock body;

across a lock body base portion located at a middle of the c-shaped lock body; and at least partially into a lock body second portion located at an opposite end of the c-shaped lock body;

to retain a handle of the movable freight container cargo door handle between the lock body base portion and the straight shackle;

establishing a shackle lock module in the c-shaped lock body; and locking the movable freight container cargo door handle by engaging the shackle lock module with a groove in the straight shackle, thereby preventing the shaft of the straight shackle from moving axially by to lock the movable freight container cargo door handle.

20. The locking method of claim 19 wherein:

sliding straight shackle comprises vertically sliding the straight shackle; and locking the movable freight container cargo door handle comprises locking a cam action freight container cargo door handle.

* * * * *